UNITED STATES PATENT OFFICE.

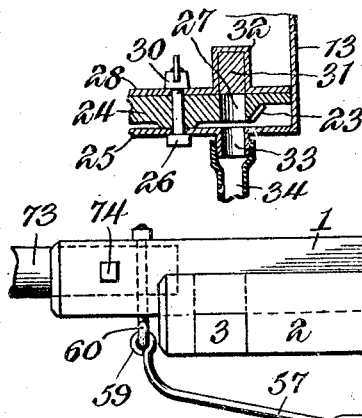

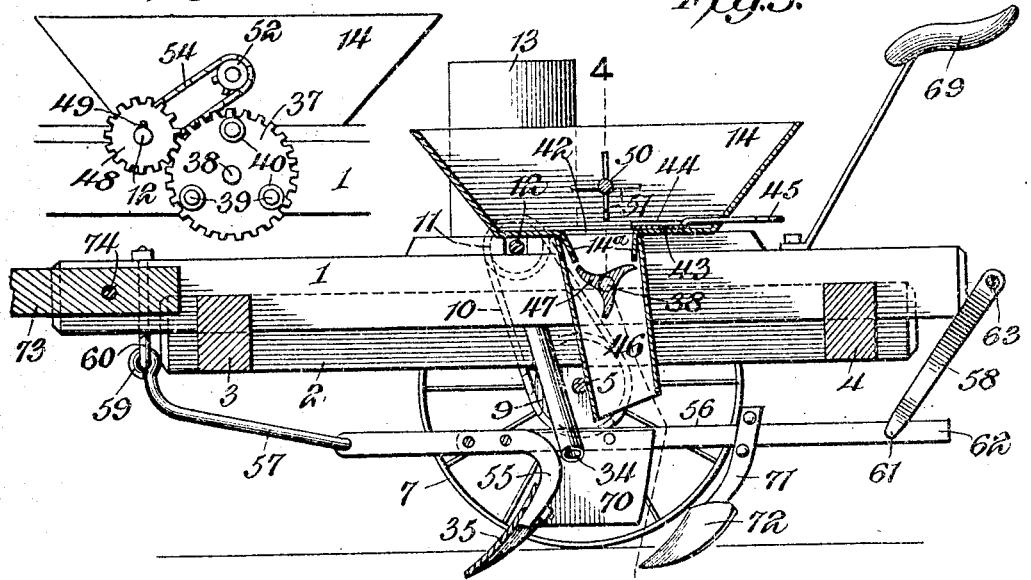

JOSIAH W. PATTY, OF LEHIGH, OKLAHOMA.

COMBINED PLANTER AND FERTILIZER-DISTRIBUTER.

No. 918,361.        Specification of Letters Patent.        Patented April 13, 1909.

Application filed May 19, 1908. Serial No. 433,757.

*To all whom it may concern:*

Be it known that I, JOSIAH W. PATTY, a citizen of the United States, residing at Lehigh, in the county of Coal and State of Oklahoma, have invented a new and useful Combined Planter and Fertilizer-Distributer, of which the following is a specification.

The invention relates to improvements in combined planters and fertilizer distributers.

The object of the present invention is to improve the construction of combined planters and fertilizer distributers, and to provide a simple and comparatively inexpensive one, designed for planting corn, cotton and various other seeds, and adapted when planting corn in hills, to drop the fertilizer on each hill, and capable when planting cotton of affording a continuous discharge of fertilizer.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a side elevation of a combined planter and fertilizer distributer, constructed in accordance with this invention, a portion of the frame and one of the side wheels being broken away to illustrate the fertilizer dropping gearing more clearly. Fig. 2 is a plan view. Fig. 3 is a central longitudinal sectional view. Fig. 4 is a transverse sectional view, taken substantially on the line 4—4 of Fig. 3. Fig. 5 is a detail sectional view, taken transversely of the seed hopper. Fig. 6 is a detail sectional view of the seed hopper, taken substantially on the line 6—6 of Fig. 2. Fig. 7 is a detail view of the fertilizer dropping gearing, showing the same for continuously dropping the fertilizer.

Like numerals of reference designate corresponding parts in all the figures of the drawings.

The frame of the machine is composed of intermediate and side longitudinal beams 1 and 2, and front and rear connecting beams 3 and 4. It is provided at opposite sides with suitable bearings for an axle 5, having journals for the reception of wheels 6 and 7. The wheel 7, which may, if desired, be provided at its periphery with lugs or projections to prevent it from slipping, is equipped at its hub with a ratchet clutch 8, arranged to actuate the axle when the wheel rotates forwardly, and adapted to permit the wheel to rotate rearwardly without turning the axle. The axle carries a sprocket wheel 9, which is connected by a sprocket chain 10 with a sprocket pinion 11 of a transverse shaft 12, extending beneath a seed hopper 13 and a fertilizer hopper 14 and provided with a slidable clutch section 17. The slidable clutch section 17 is provided with a clutch face for engaging a corresponding clutch face 18 of the sprocket pinion, and it has an annular groove, which is engaged by projections of a forked shifting lever 19, adapted to be oscillated to throw the slidable clutch member into and out of engagement with the clutch face of the pinion 11, whereby the seed dropping mechanism and the fertilizer dropping mechanism, hereinafter described, are thrown into and out of operation. The lever 19, which is fulcrumed intermediate of its ends on one of its side beams, is provided with a lip or projection 20, adapted to engage a transverse ratchet member 21 for locking the clutch sections or members in and out of engagement. The transverse ratchet member 21 is provided with a pair of notches, which are adapted to be engaged by the lip or projection 20 of the lever.

The transverse shaft carries a bevel gear 22, which meshes with beveled teeth 23 of a rotary seed disk 24, mounted upon the bottom 25 of the seed hopper and journaled on the same by means of a central bolt 26. The seed disk, which is constructed in the usual manner, is provided with an annular series of openings or seed cups 27, and it operates beneath an upper plate 28 having a slot 29 to permit the corn, or other seed to enter the seed cups or openings of the rotary seed disk. The bolt 26 is provided at the top with a thumb nut 30, and the seed hopper is provided with a brush or cut-off 31, consisting of a block mounted within a box or casing 32 and located at one end of the slot 29. The bottom 25 of the hopper is provided with a discharge opening 33, from which depends a discharge tube 34, which extends to a point in rear of a furrow opening device 35. When the transverse shaft is rotated, rotary movement will be communicated to the seed disk, and the seed will be dropped at intervals into the seed tube 34 in the usual manner.

The sprocket gear for communicating motion to the transverse shaft is located at one side of the machine, and the said shaft is provided at the opposite side of the machine with a rotary arm 35$^a$, detachably secured to the shaft by means of a set screw 36, or other suitable means and provided with an outer curved portion, forming a cam for actuating a tappet wheel 37, mounted on a transverse shaft 38 and provided with a plurality of tappets 39, adapted to be successively brought into the path of the arm 35$^a$, whereby when the transverse shaft is rotated, a rotary movement will be communicated to the shaft 38 for dropping the fertilizer. The tappets 39, which are preferably three in number so as to drop three portions of fertilizer at each revolution of the wheel 37, consists of pins provided with heads and equipped with anti-friction sleeves 40. Any number of tappets may, of course, be employed to drop the fertilizer at the desired intervals, and to properly time its dropping with relation to the dropping of the seed. The arm 35$^a$ rotates in the direction of the arrow in Fig. 1 of the drawings, and it actuates the ratchet wheel and imparts to the same one third of a complete revolution, which brings the next tappet in position to be actuated by the arm 35$^a$ at the next engagement of the same with the tappet wheel.

The fertilizer hopper 14, which is arranged centrally of the frame, is provided in its bottom with an opening 42, adapted to be varied in size by a slide 43, adjustably mounted in suitable ways 44 and provided with an operating handle 45. The handle is connected with the slide by a stem, which extends through an opening in the rear wall of the fertilizer hopper. The fertilizer hopper is equipped with a depending discharge tube 46 in which is arranged a rotary cut-off 47, having three blades or wings and adapted to discharge three portions of fertilizer at each rotation of the shaft 38. The hopper is provided at the front and back of the opening 42 with downwardly converging flanges 14$^a$, extending into the upper end of the discharge tube and coöperating with the cut-off. The fertilizer tube terminates at a point above and in rear of the furrow opener 35, and the fertilizer is dropped on the hill of corn, when the shaft 37 is rotated by the rotary arm and the tappets, and the fertilizer is also adapted to be discharged in a continuous stream, when the shaft 37 is rotated by the gearing, hereinafter described.

The fertilizer is discharged at intervals when planting corn, but when the machine is employed for planting cotton, the arm 35$^a$ is removed, and a pinion 48 is substituted for the arm, as illustrated in Fig. 7 of the drawings. A continuous rotary motion will then be communicated to the shaft 38, and the fertilizer will be dropped in a continuous stream. The pinion 48 is detachably secured to the transverse shaft by a set screw 49, or other suitable means, and it may be readily placed on and removed from the said shaft.

The fertilizer may consist of the ordinary barn yard manure, but any other form of fertilizer may be employed, and the hopper 14 is equipped with an agitator 50, consisting of a transverse shaft provided with projecting arms 51, arranged at intervals and adapted to stir the contents of the hopper. The agitator shaft extends through the sides of the hopper, and it is connected with the transverse shaft 12 by sprocket gearing, consisting of upper and lower sprocket pinions 52 and 53 and a connecting sprocket chain 54. By means of the agitator, which is located above the discharge tube 46, a proper feed of fertilizer is insured.

The furrow opener 35 is secured to a centrally arranged front standard 55 of a vertically adjustable frame 56, suspended beneath the frame of the machine by a substantially V-shaped front link 57 and a pair of rear links 58. The V-shaped front link is connected at its apex with the front of the vertically adjustable frame by being passed through a perforation thereof, and it is provided at the front terminals of its sides with eyes 59, which are linked into eyes 60 of bolts, that pierce the front extended portions of the intermediate longitudinal beams 1. The rear links are provided at their lower ends with terminal pivots 61, which are arranged in suitable perforations of side bars 62 of the vertically adjustable frame, and the upper terminals of the links 58 are pivoted by a pin 63, or other suitable fastening device to a short arm 64 of an adjusting lever 65. The adjusting lever 65 is pivoted at its angle, and it extends upward from the rear portion of the frame and is equipped with a spring actuated dog or detent 66, adapted to engage a toothed segment 67 and connected with a latch lever 68. The toothed segment is mounted on the frame of the machine, and the lever 65, which is located adjacent to a seat 69, is adapted to be oscillated to raise and lower the vertically adjustable frame to position the furrow opening device properly with relation to the soil. The vertically adjustable frame carries a pair of sides or wings 70, diverging rearwardly from the furrow opening device and secured to the side bars or members 56, which also carry a pair of rear standards 71. The rear standards 71 support a pair of covering blades 72, which are adapted to throw the soil inwardly to cover the seed after the fertilizer has been dropped upon the same. The seat 69 is provided with an inclined standard, which is secured to the rear portion of the frame.

The vertically adjustable frame is adapted to be elevated clear of the ground in transferring the machine from one field or place to another, and the machine is equipped at the front with a tongue 73, pivoted by transverse bolts 74 between the front ends of the intermediate longitudinal beams, which are extended in advance of the front transverse bar 3 of the frame.

Having thus fully described my invention, what I claim as new and desire to secure by Letters Patent, is:—

1. A machine of the class described including seed dropping mechanism provided with a rotary arm, and fertilizer dropping mechanism having a tappet wheel provided with a plurality of tappets arranged to be engaged by the rotary arm of the seed dropping mechanism.

2. A machine of the class described including seed dropping mechanism having a rotary arm provided at its outer portion with a curved cam edge, and fertilizer dropping mechanism provided with a tappet wheel having a plurality of tappets arranged to be successively actuated by the cam edge of the rotary arm.

3. A machine of the class described including seed dropping mechanism having a rotary arm, and fertilizer dropping mechanism comprising a hopper, a discharge tube, a rotary cut-off operating within the discharge tube and provided with a plurality of wings or blades, and a tappet wheel connected with the cut-off and having a series of tappets corresponding in number to the wings or blades of the cut-off and arranged to be successively actuated by the rotary arm.

4. A machine of the class described including seed dropping mechanism, fertilizer dropping mechanism comprising a hopper, a discharge tube depending from the hopper, a rotary cut-off mounted within the discharge tube and provided with a plurality of wings or blades and downwardly converging flanges located at the front and back of the discharge tube and coöperating with the cut-off, and means for communicating motion from the seed dropping mechanism to the cut-off of the fertilizer dropping mechanism.

5. A machine of the class described including seed dropping mechanism provided with a rotary arm, and fertilizer dropping mechanism comprising a hopper, a discharge tube, a cut-off operating in the discharge tube and provided with a plurality of wings or blades, downwardly converging flanges arranged at the front and back of the discharge tube and located above and coöperating with the cut-off, and a tappet wheel connected with the cut-off and provided with tappets corresponding in number with the wings or blades of the cut-off and arranged to be actuated by the rotary arm of the seed dropping mechanism.

6. In a machine of the class described, the combination of a wheeled frame, seed dropping mechanism, a transverse shaft extending across the frame, gearing for connecting the shaft with the seed dropping mechanism, separate gearing for actuating the transverse shaft, the latter gearing being provided with a clutch, a longitudinal shifting lever connected with the clutch and extending along one side of the frame, a transverse ratchet arranged to be engaged by the shifting lever, fertilizer dropping mechanism, and means for communicating motion from the transverse shaft to the fertilizer dropping mechanism.

7. In a machine of the class described, the combination of a wheeled frame, a transverse shaft, means for communicating motion to the shaft, seed dropping mechanism actuated by the transverse shaft, a fertilizer hopper provided with a discharge tube, a cut-off, a tappet wheel connected with the cut-off and provided with tappets, a rotary arm mounted on the transverse shaft and arranged to engage the tappet for actuating the cut-off, an agitator operating within the hopper, and gearing for communicating motion from the transverse shaft to the agitator.

8. In a machine of the class described, the combination of a wheeled frame, seed dropping mechanism mounted thereon, fertilizer distributing mechanism also carried by the wheeled frame, a vertically adjustable frame suspended from the wheeled frame, a furrow opener, wings diverging rearwardly from the furrow opener, discharge tubes extending from the seed dropping mechanism and the fertilizer distributing mechanism and discharging into the space between the said wings, and covering blades located in rear of the wings and carried by the adjustable frame.

In testimony, that I claim the foregoing as my own, I have hereto affixed my signature in the presence of two witnesses.

JOSIAH W. PATTY.

Witnesses:
 FRANK BOWERS,
 W. A. MEAGLE.